April 24, 1962     E. S. GYSLER     3,031,019
CULTIVATOR CLAMP
Filed Feb. 26, 1960

Ervin S. Gysler
INVENTOR.

BY *Clarence A. O'Brien*
*and Harvey B. Jacobson*
Attorneys

United States Patent Office 3,031,019
Patented Apr. 24, 1962

3,031,019
CULTIVATOR CLAMP
Ervin S. Gysler, % Gysler Manufacturing Co.,
Box 81, Fort Benton, Mont.
Filed Feb. 26, 1960, Ser. No. 11,237
6 Claims. (Cl. 172—710)

This invention relates generally to agricultural equipment and more particularly to a clamp device for resiliently clamping the shank on an implement used, for instance, in a plow, cultivator, tiller, etc.

The prior art discloses various clamping means for securing the shank of an implement to the supporting structure. Problems arise in mounting the implement inasmuch as it is important to firmly hold the shank in position as long and as hard as possible without permanently springing the shank. Moreover, it is equally important to provide means for allowing the shank to spring up when an obstruction is hit by the implement. Accordingly, it will be appreicated that some form of resilient mounting means is necessary. If the shanks are mounted too securely with little resiliency, they will be prevented from moving out of the way sufficiently to clear the obstruction. On the other hand, if the implement is working in hard ground and the mounting is not sufficiently tight, the shank will not be able to impart a sufficient reaction to the hard ground. In consideration of these problems, the invention herein discloses a novel clamp construction for facilitating the appropriate mounting of an implement shank to a supporting structure. It is a further object of this invention to provide novel clamping means for properly securing a shank for allowing the implement to be firmly mounted but for further enabling the implement to move out of the way when engaging an obstruction. The improved mounting means disclosed herein enables the land to be worked more efficiently without damage to the equipment.

It is more particularly an object of this invention to provide novel mounting means for an implement shank which is relatively simple in construction and accordingly inexpensive to manufacture and utilize, durable, and maintenance free.

It is a still further object of this invention to provide novel mounting means for the shank of an agricultural implement wherein the mounting means is provided with adjustable elements for enabling the tightness of the mounting to be varied.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figures 4, 5:
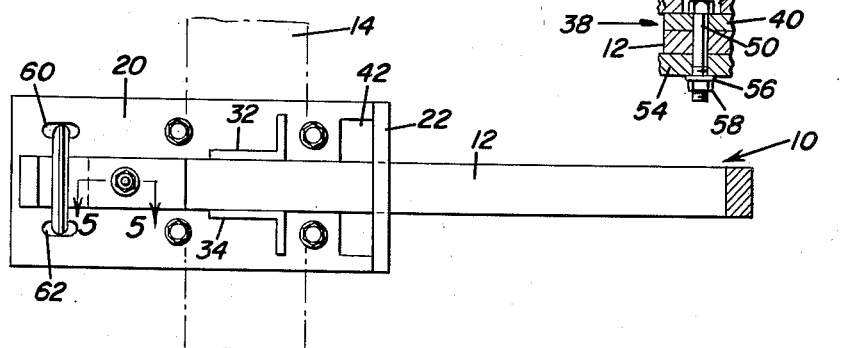
FIGURE 4 is a bottom plan view of the clamp illustrating how it secures the implement shank.
FIGURE 5 is an enlarged sectional view taken substantially along the plane 5—5 of FIGURE 4.

With continuing reference to the drawings, numeral 10 generally represents an implement utilized for working the ground. The implement 10 includes a shank 12 which is rectangular in cross-section as is best illustrated in FIGURE 4. When the implement 10 strikes an obstruction in the ground, it is desirable that there be some way by which the implement may move out of the way of the obstruction. On the other hand, it is desirable that the implement 10 be mounted firmly enough so as to properly work in hard ground. The implement 10 is to be mounted upon a supporting structure 14 illustrated as a rectangular beam.

Figure 2:
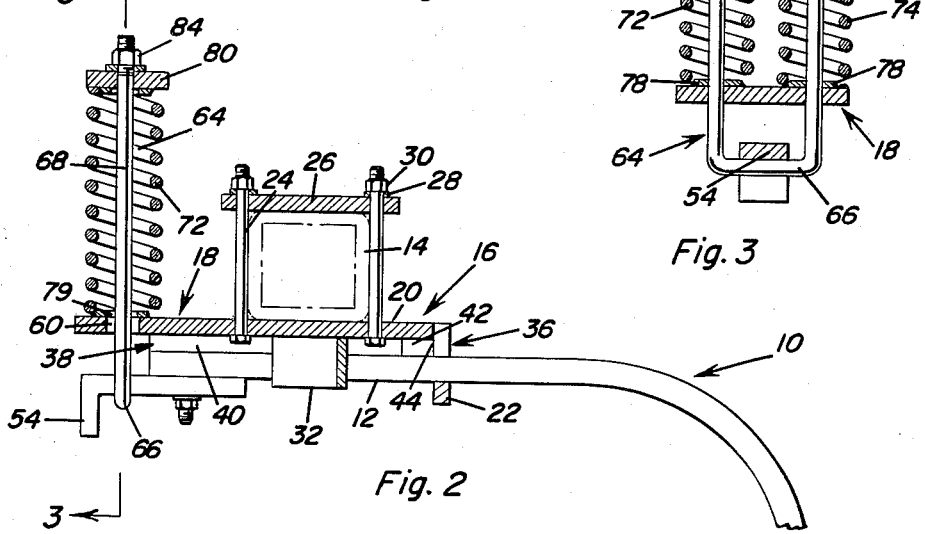
FIGURE 2 is a sectional view taken substantially along the plane 2—2 of FIGURE 1 illustrating particularly the cooperating relationship between the clamp and the implement shank.

For the purpose of mounting the implement 10 upon the supporting structure 14, a clamp generally designated as 16 is provided. The clamp 16 initially includes a frame 18 having a pair of perpendicular legs 20 and 22. Each of the legs 20 and 22 is flat with the leg 20 being longer than the leg 22. The legs 20 and 22 are disposed at right angles to each other as is best illustrated in FIGURE 2. Bolts 24 extend upwardly from beneath the leg 20 on either side of the rectangular beam 14. Straps 26 extend across the beam 14 and are received on the bolts 24. Washers 28 and nuts 30 are received on the bolt 24 to secure the frame 18 to the beam 24.

Figure 1:
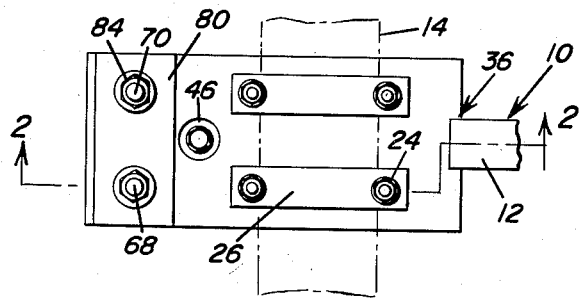
FIGURE 1 is a fragmentary top plan view of the clamp showing only a portion of the implement shank.
Figure 3:
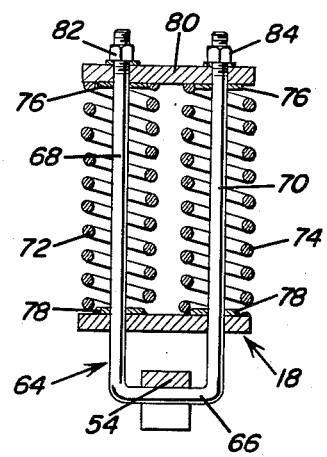
FIGURE 3 is a vertical sectional view taken substantially along the plane 3—3 of FIGURE 2.

Dependingly supported from the leg 20 is a pair of angle iron guides 32 and 34. An opening 36 is provided in the leg 22 and extends into the leg 20 as is best illustrated in FIGURES 1 and 2. The opening 36 is rectangular and the rectangular shank 12 of implement 10 extends therethrough between the angle iron guides 32 and 34. The angle iron guides 32 and 34 should be spaced so that virtually no clearance is provided between said guides and the shank 12. A T-shaped bar 38 is received between the shank 12 and the leg 20. The T-shaped bar 38 includes a main portion 40 and a cross portion 42. The cross portion 42 defines a right angle end portion 44 which is received within the included right angle between the legs 20 and 22. The cross portion 42 bears against each of the legs 20 and 22.

An aperture 46 is defined in the leg 20 of frame 18. Smaller apertures are registered with the aperture 46 being defined in both the main portion 40 of T-shaped bar 38 and the shank 12. A bolt 50 having its head 52 recessed in the aperture 46, extends through the registered apertures in the main portion 40 and shank 12. A strap 54 is provided also having an aperture registered with those of the main portion 40 and shank 12. The bolt 50 extends through the strap 54 receiving washer 56 and nut 58 thereon. Accordingly, the T-shaped bar 38, the shank 12, and the strap 54 are clamped together as a unit.

Openings 60 and 62 are defined in the leg 20 of frame 18. A U-shaped bolt 64 having a bight portion 66 and straight portions 68 and 70 extends through the opening 60 and 62. The bight portion 66 extends beneath the strap 54. Coil springs 72 and 74 are concentrically received on the straight portion 68 and 70. Bridging member 80 receives both of the straight portions 68 and 70 therethrough and nuts 82 and 84 secure bridging member 80 on the U-shaped bolt 64. Washer pairs 76 and 78 are fixed to members 80 and frame 18 respectively concentric with the springs 72 and 74 for preventing the springs from becoming off-centered and rubbing against the bolt straight portions 68 and 70. The washers 78 defines apertures 79 registered with the openings 60, 62.

The particular construction of the invention should now be understood. When the implement 10 strikes an obstruction, the right angle end portion of T-shaped bar 38 pivots in the included right angle between the legs 20 and 22 as the shank 12 tends to move counter-clockwise, as seen in FIGURE 2. The counter-clockwise tendency of shank 12 of course carries with it the T-shaped bar 38 and strap 54. The springs 72 and 74 resist the movement of the shank 12 as the bight portion 66 of the U-shaped bolt 64 tends to secure the strap 54. It will be appreciated that even when working in hard ground, the springs 72 and 74 and the fact that the right angle end portion 44 is firmly received in the included right angle between the legs 20 and 22, tend to hold the implement 10 securely. However, when a significant obstruction is engaged by the implement 10, such obstruction being large enough to normally spring the shank so as to permanently damage it, the right angle end portion 44 will pivot in the included angle between the legs 20 and 22 and the strap 54 will carry the U-shaped bolt 64 downwardly to compress the springs 72 and 74.

The pressure on implement 10 may be varied by varying the position of the bridging member 80 so as to adjust the spring tension of the spring 72 and 74. Also, by varying the thickness of the T-shaped bar 38, the original required pressure to pivot the shank 12 may be varied. In essence, what has been provided is improved mounting means for the shank 12 of an implement 10 with the mounting means including a square or right angle pivot with the right angle end portion 44 of the T-shaped bar 38 pivoting when a significant obstruction is encountered by the implement 10, in the included right angle between the legs 20 and 22.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. Clamp means in combination with an implement shank for resiliently clamping said shank to a supporting structure, comprising a frame including a pair of integral legs, a first of said legs secured horizontally to said supporting structure, a second of said legs having an opening therein adjacent to said first leg and depending from said first leg at a right angle thereto, said shank extending through said opening, a bar secured to said shank between said shank and said first leg, said bar defining a right angle end portion, said right angle end portion received in the included right angle between the first and second legs and in engagement with said legs, and resilient means connecting said shank to said first leg remote from said second leg.

2. The combination of claim 1 wherein said bar is T-shaped defining a main portion and a cross portion, said main portion superposed on and secured to said shank, said cross portion engaged with said first and second legs and defining said right angle end portion received in said included right angle between said first and second legs.

3. The combination of claim 1 wherein a strap is terminally secured to said shank remote from said second leg, said resilient means including a U-bolt, spaced apertures defined in said first leg, said U-bolt extending through said apertures and beneath the strap and having its bight portion bearing against the underside of said strap, coil springs received on said U-bolt urging said strap toward said first leg, and means for centering said springs on said U-bolt.

4. The combination of claim 1 wherein depending guides are secured to said first leg, said shank extending between said guides whereby lateral movement of said shank is prevented, said bar being T-shaped and defining a main portion and a cross portion, said main portion superposed on and secured to said shank, said cross portion engaged with said first and second legs and defining said right angle end portion received in said included right angle between said first and second legs.

5. The combination of claim 1 wherein depending guides are secured to said first leg, said shank extending between said guides whereby lateral movement of said shank is prevented, said bar being T-shaped and defining a main portion and a cross portion, said main portion superposed on and secured to said shank, said cross portion engaged with said first and second legs and defining said right angle end portion received in said included right angle between said first and second legs, a strap terminally secured to said shank remote from said second leg, said resilient means including a U-bolt, said first leg having spaced apertures therein, said U-bolt extending through said apertures and beneath the strap and having its bight portion bearing against the underside of said strap, coil springs received on said U-bolt urging said strap toward said first leg, and means for centering said springs on said U-bolt.

6. The combination of claim 1 wherein said bar is T-shaped defining a main portion and a cross portion, said main portion superposed on and secured to said shank, said cross portion engaged with said first and second legs and defining said right angle end portion received in said included right angle between said first and second legs, and a strap mounted on an end portion of the shank, said resilient means including a U-bolt, spaced apertures defined in said first leg, said U-bolt extending through said apertures and beneath the strap and having its bight portion bearing against the underside of said strap, coil springs received on said U-bolt urging said strap toward said first leg, and means for centering said springs on said U-bolt.

References Cited in the file of this patent

UNITED STATES PATENTS

| | | |
|---|---|---|
| 2,777,378 | Hunter | Jan. 15, 1957 |
| 2,869,657 | Harrop | Jan. 20, 1959 |